(12) United States Patent
Schneider et al.

(10) Patent No.: US 9,389,734 B2
(45) Date of Patent: *Jul. 12, 2016

(54) THROUGH DISPLAY ULTRASONIC TOUCH-SCREEN MONITOR

(71) Applicant: QUALCOMM Incorporated, San Diego, CA (US)

(72) Inventors: John K. Schneider, Williamsville, NY (US); Jack C. Kitchens, Buffalo, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,075

(22) Filed: Apr. 17, 2015

(65) Prior Publication Data

US 2015/0227264 A1 Aug. 13, 2015

Related U.S. Application Data

(63) Continuation of application No. 13/544,647, filed on Jul. 9, 2012, now Pat. No. 9,013,451.

(60) Provisional application No. 61/505,440, filed on Jul. 7, 2011.

(51) Int. Cl.
| | | |
|---|---|---|
| G09G 5/00 | (2006.01) | |
| G06F 3/043 | (2006.01) | |
| G09G 3/02 | (2006.01) | |
| G06F 3/0488 | (2013.01) | |
| G06F 3/041 | (2006.01) | |

(52) U.S. Cl.
CPC ............ *G06F 3/0436* (2013.01); *G06F 3/0412* (2013.01); *G06F 3/0488* (2013.01); *G09G 3/02* (2013.01)

(58) Field of Classification Search
CPC ..... G06F 3/043; G06F 3/0436; G06F 3/0433; G06F 3/0416; G06F 3/041
See application file for complete search history.

(56) References Cited

U.S. PATENT DOCUMENTS

| | | | | |
|---|---|---|---|---|
| 6,382,028 | B1 * | 5/2002 | Wooh | G01N 29/043 73/602 |
| 7,683,323 | B2 * | 3/2010 | Kymissis | G01J 5/34 250/338.3 |
| 8,576,202 | B2 * | 11/2013 | Tanaka | G06F 3/0436 345/177 |
| 2006/0188537 | A1 * | 8/2006 | Lamba-Kohli | A01N 33/12 424/405 |
| 2009/0235750 | A1 | 9/2009 | Chang et al. | |
| 2009/0273583 | A1 * | 11/2009 | Norhammar | G06F 3/0436 345/177 |
| 2010/0194705 | A1 * | 8/2010 | Kim | G06F 1/1626 345/173 |
| 2010/0285277 | A1 * | 11/2010 | Edwards | C03C 27/048 428/157 |
| 2012/0144920 | A1 * | 6/2012 | Wong | B06B 1/02 73/632 |

\* cited by examiner

*Primary Examiner* — Olga Merkoulova

(74) *Attorney, Agent, or Firm* — Weaver Austin Villeneuve & Sampson LLP

(57) ABSTRACT

A touch-screen monitor is described. The monitor includes an ultrasonic sensor for detecting motion of an object that is placed in contact with the monitor.

20 Claims, 3 Drawing Sheets

THROUGH DISPLAY ULTRASONIC TOUCH-SCREEN MONITOR

CROSS-REFERENCE TO RELATED APPLICATION

This application is a continuation of U.S. patent application Ser. No. 13/544,647, which was filed on Jul. 9, 2012, now U.S. Pat. No. 9,013,451, which issued on Apr. 21, 2015, which claims the benefit of priority to U.S. provisional patent application Ser. No. 61/505,440, which was filed on Jul. 7, 2011.

FIELD OF THE INVENTION

The present invention relates to touch-screen monitors.

BACKGROUND OF THE INVENTION

Visual displays have advanced to the point where many are small, thin, nearly flat and light-weight. Visual displays include LED flat panel displays and LCD flat panel displays. Some video displays allow the user to identify images provided on the visual display by touching a surface covering the visual display, and these are commonly referred to as "touch-screen monitors". A touch-screen monitor is commonly used to provide a user with an easy means to identify icons and otherwise control a computer without the use of a mouse. However, touch-screen monitors are not without problems.

For example, existing touch-screen monitors that are based on capacitance require use of a conductive object, such as a finger, carbon filled stylus, or metal stylus, and the conductive object must be grounded to the display's case. As such, these capacitance-based touch-screen monitors do not work well when water exists between the touch-screen monitor and the conductive object, such as when the monitor is wet from rain, or the object is a sweaty finger.

Other touch-screen monitors are optically-based. These optical-based touch-screen monitors may not work properly in direct sun light or in darkness because the optical sensors require some, but not too much, ambient light in order to function properly.

SUMMARY OF THE INVENTION

The invention may be embodied as a touch-screen monitor which combines a visual display and an ultrasonic sensor ("USS"). Such an embodiment of the invention includes a protective platen positioned so that the visual display resides between the protective platen and the USS. A control system is provided, and the control system is configured to capture information about an object that is in contact with the protective platen. Once information is captured at two different times, the control system compares the two information sets and determines a location and a movement direction of the object.

The USS is configured to generate ultrasonic waves, and detect reflected ultrasonic energy. Using range-gating, the USS can produce an output signal corresponding to ultrasonic energy that was reflected at the exposed surface of the protective platen, and it is this output signal which carries information about the object that is in contact with the exposed surface of the protective platen. For example, those areas which are detected to have low ultrasonic intensity correspond to the location of an object that contacts the exposed surface of the protective platen.

The USS may include an ultrasonic wave generator, a piezoelectric hydrophone receiver array, and an ultrasonic TFT receiver array. In some embodiments of the invention, rather than having distinct devices for generating and receiving ultrasonic energy, the USS may utilize the same device (or array of devices) for generating and detecting ultrasonic energy.

A signal processor may be included. The signal processor is configured to modify signals produced by the USS in order to compensate for attenuation differences imposed by variations in the visual display. In this manner, variations in the visual display can be compensated for, thereby eliminating noise from the output signal.

BRIEF DESCRIPTION OF THE FIGURES

The invention will now be described by way of a non-limiting example, with reference to the attached drawings and diagrams in which.

DETAILED DESCRIPTION OF THE INVENTION

Figure 1:
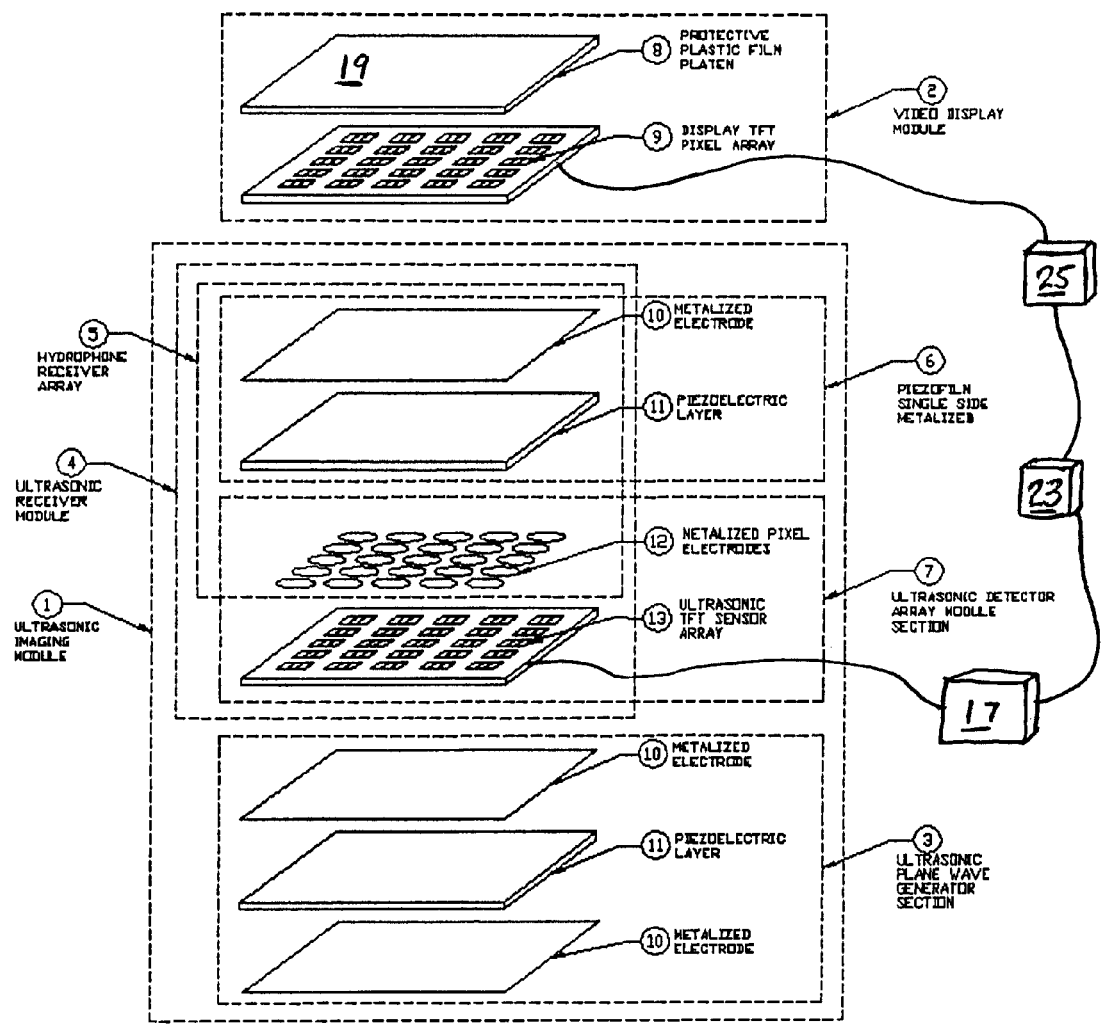
FIG. 1 is an exploded view of the component parts of a system that is in keeping with the invention.

This invention uses an ultrasonic pulse-echo scanning system coupled with a visual display to create a touch-screen monitor. The touch-screen monitor may be used to capture information about an object that a user touches to the touch-screen monitor. If the object is the user's finger, the system might be used to generate a fingerprint image of the user's finger. Such capability would be useful in restricting use of the touch-screen monitor to those who are authorized to do so. However, the touch-screen monitor based on ultrasonic sensing of the object has additional, and probably more important uses. For example, the invention can be used to allow the user to select items that are displayed on the visual display. The ability to select displayed items can be used to control the movement of a cursor displayed on the visual display, or select icons displayed on the monitor, or otherwise control a computer that is in communication with the touch-screen monitor.

The ultrasonic sensor included in the touch-screen monitor is configured to emit an ultrasonic wave and configured to detect energy reflected from a surface. Such ultrasonic sensors may include an array of wave emitters to generate ultrasonic waves, and an array of wave detectors to detect the reflected ultrasonic energy. Other ultrasonic sensors that may be used in the invention may utilize a single large ultrasonic wave emitter and an array of ultrasonic wave detectors. Another type of ultrasonic sensor that is suitable for use in the invention may utilize the same component to emit the ultrasonic wave(s) and detect the reflected ultrasonic energy.

The ultrasonic sensor has an electronic control system that supplies timing signals, which cause the wave emitter(s) to generate one or more ultrasonic waves, and also cause the wave detectors to produce signals that are indicative of reflected ultrasonic energy received by the detectors. Each detector in the receiver array may be thought of as a pixel of the ultra-sound device, each pixel providing information about a small portion of the overall area that is being scanned for information by the ultrasonic sensor.

Each ultrasonic detector may be individually calibrated to remove fixed pattern noise effects, such as the noise effects that may result from thin-film transistor ("TFT") circuits that make up the visual display. Alternatively, a signal from an uncalibrated ultrasonic detector can be adjusted to produce a calibrated signal that is free (or nearly free) from the noise effects. Calibration is well known in the industry, and it suffices to say that such calibration may be effected by using one or more references and altering the output of the system until the output matches the reference.

Noise effects arise (for example) from variations in the amplifiers associated with pixels of the visual display, and from variations created by the manufacturing process (glue, contaminants, etc.) In coupling an ultrasonic sensor with a visual display to create a touch-screen monitor, variations in ultrasonic attenuation resulting from differences between locations on the visual display (the "noise effects") will be compensated for either (a) by calibrating the ultrasonic detectors to compensate for the noise-effects, or (b) by processing the output signals produced by the ultrasonic detectors, or both, in order to yield a final set of information that is free (or relatively free) of the noise effects.

Having provided a general overview of the invention, the invention will now be described in more detail by way of a non-limiting example. The example provided herein should not be interpreted as limiting the scope of the invention, and it should be kept in mind that those versed in the art would be able to configure a number of similar configurations that achieve the same or similar results in design and/or function, and yet these similar configurations are within the scope of the invention.

Figure 2:
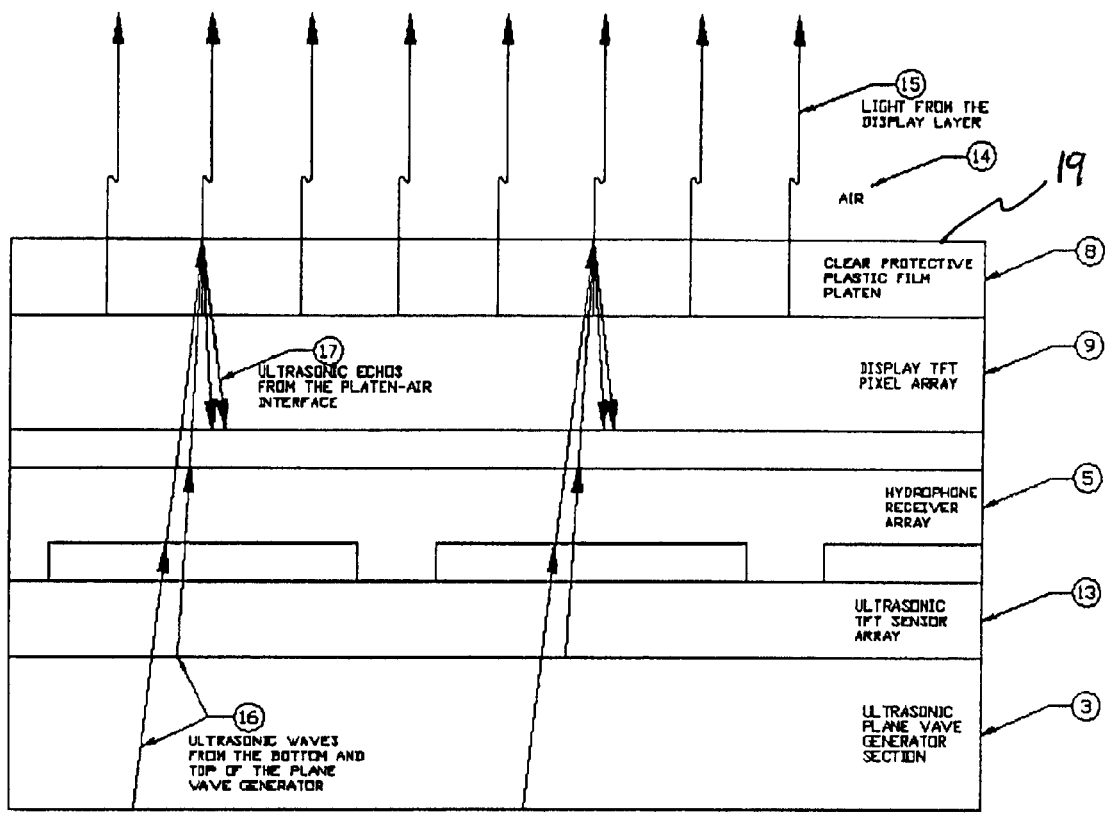
FIG. 2 is schematic of the system depicted in FIG. 1 showing light from the display, and also schematically showing ultrasonic energy waves traveling from a plane wave generator 3 through various layers of the system, and reflected ultrasonic energy returning as an echo, where it is received by the ultrasonic hydrophone receiver array 5.
Figure 3:
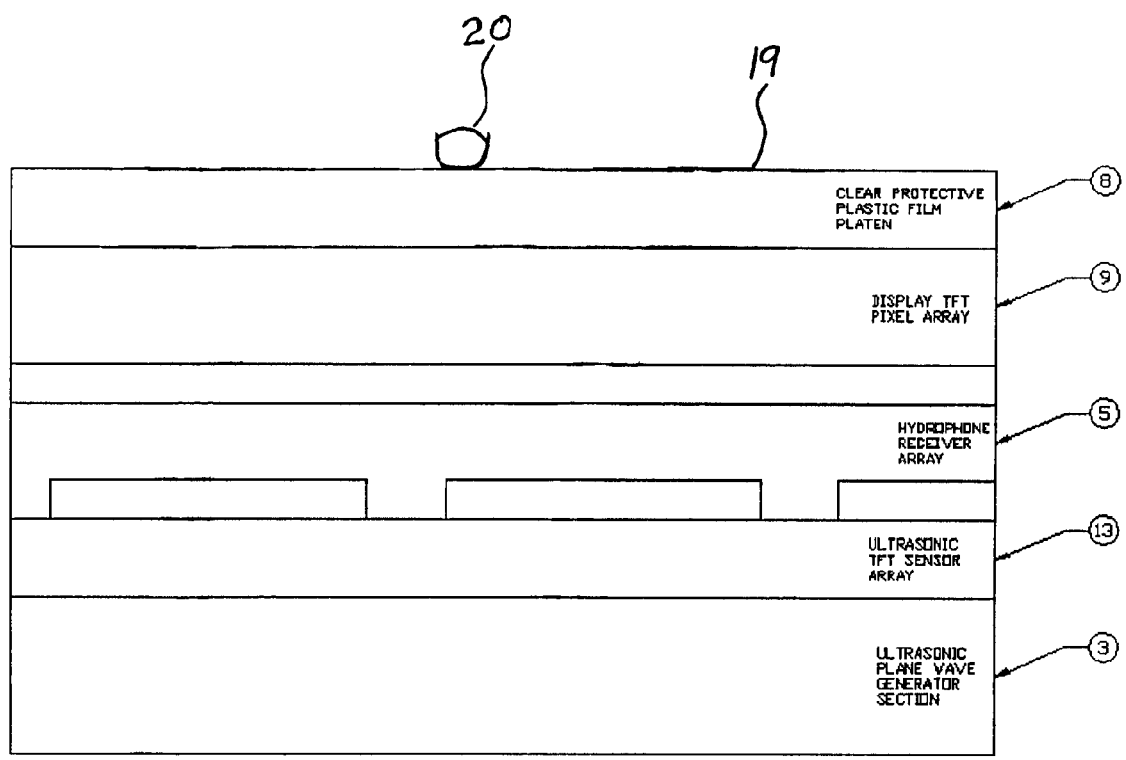
FIG. 3 is a schematic of the system depicted in FIG. 2 showing an object 20 contacting the exposed surface 19 of the platen 8.

With reference to FIGS. 1-3, one particular embodiment of the invention will now be described. That embodiment includes a piezoelectric ultrasonic sensor 1 coupled to a visual display module 2. The visual display module 2 may include an array of TFTs 9, and a translucent protective platen 8, which may be laminated to the surface of the TFT array 9. The protective platen 8 may be made of plastic, such as PET (polyethylene terephthalate), PEN (polyethylene naphthalate), PMMA (poly methyl methacrylate), or other polymeric material. Other materials that may be suitable for use as a protective platen 8 may include silane, a ceramic material (such as alumina, borundum, zinc oxide, or carborundum), or a glass (such as those sold under the tradenames "Gorilla Glass" or "Willow Glass").

In operation, the visual display module 2 may operate like a standard flat panel visual display module, wherein a computer control system (not shown) directs various pixel emitters on the display module 2 to turn on and emit light, or stay off, in order to produce a visual picture display. To this visual display module 2, an ultrasonic sensor 1 may be attached, for example by means of polymeric glue or other adhesive. The resulting arrangement sandwiches the visual display module 2 between the protective platen 8 and the ultrasonic sensor 1. The ultrasonic sensor 1 may be comprised of a plane wave generator 3, an ultrasonic hydrophone receiver array 5, a TFT sensor array 13, and a control system 23. The ultrasonic sensor 1 is described in more detail in U.S. Pat. No. 7,436,736, the description of which is incorporated herein by reference. If calibration of the output signal is needed to remove noise effects, a signal processor 17 may be included.

In operation, a plane wave is generated by the plane wave generator 3. The ultrasonic wave travels through the TFT sensor 13 and hydrophone receiver array 5. Using range gating, energy that is reflected as the wave travels toward the display module 9 is effectively ignored by the signal processor 17, even though the hydrophone receiver array 5 and the TFT sensor array 13 detect that reflected energy. The ultrasonic wave continues through the visual display module 2 to the exposed surface 19 of the protective platen 8. At the exposed surface 19 of the protective platen 8, the ultrasonic energy may either be (a) absorbed or scattered by an object 20 that is in contact with the protective platen 8, such as the skin of a finger, or (b) reflected back. In those locations where air contacts the exposed surface 19 of the platen 8, most of the ultrasound wave will be reflected back toward the hydrophone receiver array 5. Ultrasonic energy that is reflected from the exposed surface 19 of the protective platen 8 passes through the visual display TFT array 9 and then is detected by the hydrophone receiver array 5 and converted into electrical charges. The hydrophone array 5 is a piezo-electric device that converts the reflected ultrasonic pressure energy into electrical charges.

The charges from the hydrophone array 5 are amplified by the TFT sensor array 13 and then provided to the control system 23, which processes the amplified signals according to a desired processing method. The control system 23 may use the output signals to construct a digital image of the object that is in contact with the exposed surface 19 of the platen 8. Also, the control system 23 may over time successively sample the output signals from the TFT sensor array 13 in order to detect movement of the object that is in contact with the exposed surface 19 of the platen 8. Successive output signals from the TFT sensor array 13 may be compared by the control system 23 in order to determine differences between the output signals, and interpret the differences as movement of the object. The detected movement of the object may be interpreted by the control system 23 as indicating a desire by the user to move a pointing device that is displayed on the visual display module 2, and thereby allow the user to identify desired actions to a computer 25. For example, the user may move a cursor that is displayed on the visual display module 2 to coincide with an icon of a word processor, and select that icon in order to instruct the computer 25 to open the word processor for use by the user.

The ultrasonic sensor 1 treats the visual display module 2 as ultrasonic transmission media that resides on the surface of the ultrasonic sensor 1. As such, variations in ultrasonic transmissivity of the visual display module 2 likely need to be accounted for by calibrating the detectors of the detector array 7, or via software that controls the signal processor 17, or both. In doing so, the visual display module 2 would be effectively rendered ultrasonically translucent, thereby allowing for precise monitoring of the location of the object 20 that contacts the exposed surface 19 of the platen 8.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:
1. A method of detecting an object, comprising:
sending, with an ultrasonic sensor, ultrasonic waves through a display TFT pixel array to the object, which is in contact with a protective platen, wherein the display TFT pixel array resides between the protective platen and the ultrasonic sensor;

detecting, with the ultrasonic sensor, reflected ultrasonic energy sent through the display TFT pixel array for detection of the object;

producing, with the ultrasonic sensor, output signals corresponding to the detected reflected ultrasonic energy;

comparing, with a control system in communication with the ultrasonic sensor, the output signals from the ultrasonic sensor; and determining differences between output signals produced at different times based on the compared output signals.

2. The method of claim 1, wherein the ULTRASONIC SENSOR includes:
an ultrasonic wave generator;
a piezoelectric receiver; and
an ultrasonic TFT receiver array.

3. The method of claim 1, further comprising interpreting, with the control system, the differences between the output signals as movement of the object.

4. The method of claim 1, further comprising determining, with the control system, a location of the object.

5. The method of claim 1, wherein the protective platen includes a polymeric material.

6. The method of claim 1, wherein the protective platen includes a silane material.

7. The method of claim 1, wherein the protective platen includes a ceramic material.

8. The method of claim 1, wherein the protective platen includes glass.

9. The method of claim 1, further comprising modifying, with a signal processor, the output signals to compensate for variations in ultrasonic transmissivity.

10. A touch-screen monitor, comprising:
an ultrasonic sensor;
a protective platen;
a display TFT pixel array residing between the protective platen and the ultrasonic sensor; and
a control system in communication with the ultrasonic sensor, wherein:
the ultrasonic sensor is configured to generate ultrasonic waves that pass through the display TFT pixel array to an object in contact with the protective platen, and wherein the ultrasonic sensor is configured to detect reflected ultrasonic energy passed through the display TFT pixel array to the ultrasonic sensor for detection of the object on the platen and to produce output signals corresponding to the detected reflected ultrasonic energy, and the control system is configured to compare the output signals from the ultrasonic sensor and determine differences between output signals produced at different times.

11. The touch-screen monitor of claim 10, wherein the ultrasonic sensor includes:
an ultrasonic wave generator;
a piezoelectric receiver; and
an ultrasonic TFT receiver array.

12. The touch-screen monitor of claim 10, wherein the control system is configured to interpret the differences between output signals as movement of the object.

13. The touch-screen monitor of claim 10, wherein the control system is configured to determine a location of the object.

14. The touch-screen monitor of claim 10, wherein the protective platen includes a polymeric material.

15. The touch-screen monitor of claim 10, wherein the protective platen includes a silane material.

16. The touch-screen monitor of claim 10, wherein the protective platen includes a ceramic material.

17. The touch-screen monitor of claim 10, wherein the protective platen includes glass.

18. The touch-screen monitor of claim 11, further comprising a signal processor configured to modify the output signals to compensate for variations in ultrasonic transmissivity.

19. A system for detecting an object, comprising:
means for sending ultrasonic waves through a display TFT pixel array to an object in contact with a protective platen, wherein the display TFT pixel array resides between the protective platen and the ultrasonic sensor;
means for detecting reflected ultrasonic energy sent through the display TFT pixel array for detection of the object in contact with the protective platen;
means for producing output signals corresponding to the detected reflected ultrasonic energy;
means for comparing the output signals from the ultrasonic sensor; and
means for determining differences between output signals produced at different times based on the compared output signals.

20. The system of claim 19, further comprising:
means for modifying the output signals to compensate for attenuation differences imposed by variations in ultrasonic transmissivity.

* * * * *